US012563171B1

(12) United States Patent
Strandborg et al.

(10) Patent No.: US 12,563,171 B1
(45) Date of Patent: Feb. 24, 2026

(54) AUTOMATED CALIBRATION OF MULTISCOPIC DISPLAYS

(71) Applicant: Distance Technologies Oy, Helsinki (FI)

(72) Inventors: Mikko Strandborg, Hangonkylä (FI); Petteri Timonen, Helsinki (FI); Tuomas Lukka, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/245,774

(22) Filed: Jun. 23, 2025

Related U.S. Application Data

(63) Continuation-in-part of application No. 19/190,945, filed on Apr. 28, 2025, now Pat. No. 12,388,971.

(51) Int. Cl.
| | |
|---|---|
| *H04N 13/327* | (2018.01) |
| *H04N 13/32* | (2018.01) |
| *H04N 13/383* | (2018.01) |

(52) U.S. Cl.
CPC ........... *H04N 13/327* (2018.05); *H04N 13/32* (2018.05); *H04N 13/383* (2018.05)

(58) Field of Classification Search
CPC ..... H04N 13/327; H04N 13/32; H04N 13/383
USPC ......................................................... 348/51
See application file for complete search history.

(56) References Cited

U.S. PATENT DOCUMENTS

| | | | | |
|---|---|---|---|---|
| 12,469,209 | B1 * | 11/2025 | Strandborg | G06T 7/90 |
| 2017/0127043 | A1 * | 5/2017 | Brown | G02B 30/30 |
| 2020/0307437 | A1 * | 10/2020 | Thieberger | G05D 1/6985 |
| 2025/0119518 | A1 * | 4/2025 | Park | H04N 13/327 |

FOREIGN PATENT DOCUMENTS

KR        102570277  B1 *  8/2023  ............... G06T 5/80

* cited by examiner

*Primary Examiner* — Behrooz M Senfi
(74) *Attorney, Agent, or Firm* — Ziegler IP Law Group, LLC.

(57) ABSTRACT

A system including: a multiscopic display; camera(s) that is/are positioned such that a display area of the multiscopic display lies at least partially within a field of view of the camera(s); and processor(s) configured to: display an image via the multiscopic display, whilst capturing image(s) of the display area using the camera(s); rectify the captured image(s) of the display area, to represent the display area only; generate a frequency-domain representation of the displayed image and a frequency-domain representation of the captured image(s) of the display area after rectifying; and determine a correct value of parameter(s) of a multiscopic optical element of the multiscopic display, based on the frequency-domain representation of the displayed image and the frequency-domain representation of the captured image(s) of the display area.

20 Claims, 4 Drawing Sheets

302

304

306

310a

308

310b

312

310

D

AUTOMATED CALIBRATION OF MULTISCOPIC DISPLAYS

CROSS-REFERENCE TO RELATED APPLICATIONS

This application is a continuation-in-part of U.S. patent application Ser. No. 19/190,945, titled "AUTOMATED CALIBRATION OF MULTISCOPIC DISPLAYS" filed on Apr. 28, 2025, which is incorporated herein by reference.

TECHNICAL FIELD

The present disclosure relates to systems for automated calibration of multiscopic displays using frequency domain. The present disclosure also relates to methods for automated calibration of multiscopic displays using frequency domain.

BACKGROUND

Multiscopic displays are widely used in applications such as three-dimensional (3D) visualisation, augmented reality (AR), virtual reality (VR), and automotive heads-up displays (HUDs). A multiscopic display often relies on a precise alignment between a multiscopic optical element (for example, a lenticular array or a parallax barrier) of the multiscopic display and an underlying pixel array of the multiscopic display to present high-quality images to different eyes of a user.

However, calibration of such multiscopic displays is a critical and challenging process. Typically, the calibration of the multiscopic displays is performed manually, requiring skilled operators to align the multiscopic optical element with the pixel array. This process is time-consuming, labour-intensive, and prone to human error. Additionally, the calibration tends to drift over time due to factors such as thermal expansion, mechanical stress, or environmental changes, necessitating frequent re-calibration to maintain optimal performance of the multiscopic displays. Furthermore, existing techniques for calibrating the multiscopic displays cause interruptions during normal operation of the multiscopic displays.

Some existing techniques for calibrating the multiscopic displays utilise test patterns and manual adjustments. For example, operators visually inspect interference patterns caused by a misalignment between the multiscopic optical element and the underlying pixel array, and adjust settings of the multiscopic optical element accordingly. While this approach can achieve acceptable results, it is not scalable for mass production or real-time re-calibration in dynamic environments. Additionally, such manual calibration lacks the precision required for advanced applications, such as automotive displays or AR/VR systems, where even minor misalignments results in significant visual artifacts, such as crosstalk, ghosting, or incorrect depth perception, which deteriorates an overall viewing experience of users.

Therefore, in light of the foregoing discussion, there exists a need to overcome the aforementioned drawbacks.

SUMMARY

The present disclosure seeks to provide a system and a method for automated calibration of a multiscopic display using frequency domain. The aim of the present disclosure is achieved by a system and a method which enable automated calibration of a multiscopic display, by determining the at least one parameter (for example, such as a pitch, an orientation, a phase, and/or a thickness) of a multiscopic optical element, based on frequency-domain representations of a displayed image and captured image(s) of a display area of a multiscopic display, in real time or near-real time. This eliminates manual intervention and ensures significantly high accuracy, scalability, and reliability of the multiscopic display during its operation, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3C illustrates an exemplary frequency-domain representation of the displayed image, while

DETAILED DESCRIPTION OF EMBODIMENTS

Figure 1:
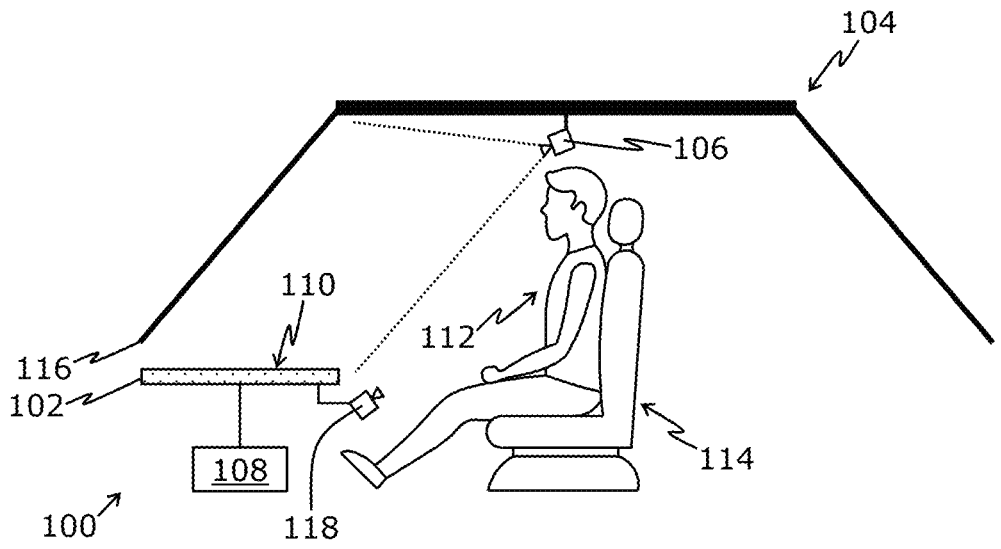
FIG. 1 illustrates a simplified example implementation of a system for automated calibration of a multiscopic display using frequency domain, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

a multiscopic display;

at least one camera that is positioned such that a display area of the multiscopic display lies at least partially within a field of view of the at least one camera; and at least one processor configured to:

display an image via the multiscopic display, whilst capturing at least one image of the display area using the at least one camera;

rectify the at least one captured image of the display area, to represent the display area only;

generate a frequency-domain representation of the displayed image and a frequency-domain representation of the at least one captured image of the display area after rectifying; and determine a correct value of at least one parameter of a multiscopic optical element of the multiscopic display, based on the frequency-domain representation of the displayed image and the frequency-domain representation of the at least one captured image of the display area.

In a second aspect, an embodiment of the present disclosure provides a method comprising:

displaying an image via a multiscopic display, whilst capturing at least one image of a display area of the multiscopic display using at least one camera, wherein the at least one camera is positioned such that the display area lies at least partially within a field of view of the at least one camera;

rectifying the at least one captured image of the display area, to represent the display area only;

generating a frequency-domain representation of the displayed image and a frequency-domain representation of the at least one captured image of the display area after rectifying; and determining a correct value of at least one parameter of a multiscopic optical element of the multiscopic display, based on the frequency-domain representation of the displayed image and the frequency-domain representation of the at least one captured image of the display area.

The present disclosure provides the aforementioned system and the aforementioned method that offer several technical benefits over the prior art in terms of calibrating multiscopic displays. First, unlike existing manual calibration techniques that are time-consuming and require operator skill, the system and the method of the present disclosure automatically determine the correct value of the at least one parameter (for example, such as a pitch, an orientation, a thickness, and a phase) of the multiscopic optical element by analysing frequency-domain representations of the displayed image and the at least one captured image, thereby eliminating the need for human intervention. This results in significant reduction of calibration time and improved accuracy, even in scenarios where calibration drifts over time due to factors, for example, such as a thermal expansion of the multiscopic display, the multiscopic display being exposed to a mechanical stress, and the like. Second, by eliminating the need for human intervention, the system and the method ensure a scalable and repeatable calibration process, making it particularly well-suited for mass production of the multiscopic displays. For example, the system can be seamlessly integrated into factory calibration procedures, enabling efficient and consistent set-up of the multiscopic displays at scale. Third, the system and the method leverage software-based corrections, offering exceptional flexibility to accommodate a wide range of display configurations for calibration purposes. Fourth, frequency-domain-based calibration approach can be performed both on-the-fly (namely, in real time when the multiscopic display is actively in use, allowing for immediate adjustments based on current conditions) and separately (for example, during an initial setup of the multiscopic display or at regular intervals, ensuring that the multiscopic display maintains its performance over time). Fifth, the system and the method are susceptible to achieve the aforesaid technical benefits with minimal hardware requirements. For example, an existing tracking camera can be utilised for an image capturing operation and any standard processor can be used for executing processing steps of the method, thereby eliminating the need for any specialised hardware. This also reduces costs and simplifies a practical implementation of the system, making it accessible for diverse applications, for example, such as automotive heads-up displays, augmented-reality displays, and the like. Together, these technical benefits provide a robust, cost-effective, and fully-automated real time calibration solution, improving the reliability, scalability, usability, and performance of the multiscopic displays, whilst reducing their operational complexity.

It will be appreciated that it is important to calibrate the multiscopic displays because their performance and visual quality output depend heavily on a value of the at least one parameter of the multiscopic optical element. Any incorrect value of the at least one parameter can result into visual artifacts such as interference patterns, incorrect depth perception, or reduced image clarity, which degrade an overall viewing experience of users. Thus, the calibration of the multiscopic displays using frequency domain ensures that the multiscopic displays produce accurate multiscopic images, providing an intended three-dimensional (3D) effect (namely, a depth perception) or multi-view functionality without any visual distortions. This significantly improves the overall viewing experience of the users.

For illustration purposes, there will now be described how the system and the method work to achieve the aforementioned technical benefits. In operation, the aforementioned steps can be performed as follows:

1. The image is displayed via the multiscopic display, whilst the at least one image of the display area is captured using the at least one camera. In this regard, in some implementations, the image is a multiscopic image that is generated based on optical locations of eyes of at least one user. This is particularly beneficial when calibration of the multiscopic display is to be performed on-the-fly. In other implementations, the image is any standard image (namely, a non-multiscopic image). This is particularly beneficial when calibration of the multiscopic display is to be performed separately, for example, during the initial setup of the multiscopic display or at regular intervals.

Positioning the at least one camera in a manner that the display area lies at least partially within the field of view of the at least one camera enables in capturing the at least one image of the display area. It will be appreciated that the field of view of the at least one camera encompasses both a direct field of view and a reflected field of view. This means that the at least one camera is capable of capturing images of the display area directly and/or through a reflective surface. In scenarios where the display area is directly visible to the at least one camera without any reflective surface in its optical path, the direct field of view allows the at least one camera to capture the images of the display area directly. This, for example, is applicable where the multiscopic display is implemented as a transparent display. In scenarios where the display area is visible to the at least one camera through a reflective surface, for example, such as a semi-reflective surface of an optical combiner, the reflected field of view allows the at least one camera to capture the images of the display area indirectly. Further, in scenarios where the display area is visible to the at least one camera both directly and through the reflective surface, the direct field of view allows to capture the display area as-is, while the reflected field of view allows to capture the display area in a reflected manner. In such scenarios, the at least one image would represent both a direct view and a reflected view of the display area.

2. The at least one captured image of the display area is rectified to represent the display area only. In this regard, performing the step of rectifying the at least one captured image ensures that the at least one captured image is corrected for any distortions or extraneous elements (for example, visual representation of objects except the display area) that may affect the accuracy of the calibration process. Optionally, when rectifying the at least one captured image, the at least one processor is configured to employ undistortion and cropping. By undistorting the at least one captured image, the at least one processor corrects geometric distortions (for example, such as a pincushion distortion, a barrel distortion, or other similar distortions) in the at least one captured image. This is necessary to perform because said distortions can cause inaccuracies in visual representation of the display area in the at least one captured image, resulting into errors in generating and analysing the frequency-domain representation of the at least one captured image. By undistorting the at least one captured image, the at least one processor ensures that the at least one captured image accurately represents a geometry of the display area. It will be appreciated that undistorting the at least one captured image compensates for distortions in an optical path from the multiscopic display towards the at least one camera, due to at least one of: an optical combiner, a semi-reflective mirror, a curvature of the display area, a curvature of the optical combiner. The step of performing the undistortion could also be performed for purposes other than those mentioned hereinabove. Furthermore, the at least one processor can perform cropping to isolate the display area in the at least one captured image, removing any extraneous elements outside the display area. This ensures that visual information of only relevant portion of the at least one captured image (i.e., the display area) is available for further processing, thereby improving the efficiency and accuracy of the calibration process. The step of rectifying the at least one captured image by undistorting and cropping can be performed using any suitable well-known technique. It will be appreciated that any well-known computer vision (CV) methods can be employed to detect an outline of the display area in the at least one captured image. Based on the detected outline, an approximate rectification of the at least one captured image can also be performed. Optionally, in this regard, ARUCO or similar markers can be physically placed near the display area, and then the at least one captured image can be captured. The at least one processor can analyse locations of said ARUCO or similar markers to deduce the outline of the display area in the at least one captured image, and can perform approximate rectification of the at least one captured image.

3. After rectifying, the frequency-domain representation of the displayed image and the frequency-domain representation of the at least one captured image of the display area, are generated. In this regard, the term "frequency-domain representation" of a given image refers to a mathematical transformation of the given image from a spatial domain (wherein the given image is represented in terms of pixel values) to a frequency domain wherein the given image is expressed in terms of its frequency components. The frequency-domain representation of the given image highlights various frequency components or repeating structures present in the given image. The term "given image" encompasses the displayed image and the at least one captured image. The step of generating the frequency-domain representation of the displayed image and the frequency-domain representation of the at least one captured image can be performed using any suitable well-known technique, for example, such as a Fast Fourier Transform (FFT) technique, a Discrete Fourier Transform (DFT) technique, a wavelet transform technique, or any other spectral analysis-based technique.

4. The correct value of the at least one parameter of the multiscopic optical element of the multiscopic display, is determined, based on the frequency-domain representation of the displayed image and the frequency-domain representation of the at least one captured image of the display area. In this regard, by comparing the two aforesaid frequency-domain representations, it can be observed how the multiscopic optical element has altered or aliased the displayed image spatially. This comparison reveals differences, for example, such as shifts, distortions, or repetitions in frequency components (of the two aforesaid frequency-domain representations) that are directly related to the at least one parameter of the multiscopic optical element. The at least one processor then analyses said differences to determine the correct value of the at least one parameter. A technical benefit of using frequency-domain representations is that certain effects introduced by the multiscopic optical element, for example, such as spatial aliasing, are more easily and accurately detected and measured in the frequency domain as compared to the spatial domain. This approach allows for robust, automated, and objective determination of the at least one parameter, ensuring that the multiscopic display operates with significant visual quality and performance, upon calibration. In an example, the displayed image may be a high-frequency two-dimensional (2D) sinusoid (i.e., a point in its frequency-domain representation), and the at least one captured image may be an aliased lower-frequency 2D sinusoid (i.e., another point in its frequency-domain representation). In such a case, a delta between these two points could define a pitch of the multiscopic optical element.

Throughout the present disclosure, the term "parameter" of the multiscopic optical element refers to a measurable or adjustable characteristic of the multiscopic optical element that defines its optical alignment, structure and/or operational behaviour, which affects quality and accuracy of images produced by the multiscopic display. Optionally, the at least one parameter comprises at least one of: a pitch, an orientation, a thickness, a phase, of the multiscopic optical element.

There will now be discussed how correct values of different parameters of the multiscopic optical element are determined, using frequency-domain analysis.

Optionally, the at least one parameter comprises a pitch of the multiscopic optical element, wherein when determining the correct value of the at least one parameter, the at least one processor is configured to:

identify a frequency component or repeating structure in the frequency-domain representation of the displayed image;

identify periodic copies of the frequency component or repeating structure in the frequency-domain representation of the at least one captured image; and determine a correct value of the pitch based on a distance between adjacent ones of the periodic copies and a grid size of the frequency-domain representation of the at least one captured image.

The term "pitch" of the multiscopic optical element can be defined depending on how the multiscopic optical element is implemented. The pitch of the multiscopic optical element determines how a multiscopic image is split and directed towards different viewing angles. In a case, when the multiscopic optical element is implemented as a lenticular array, the pitch is a centre-to-centre distance between adjacent lenticules (for example, individual cylindrical lenses). In another case, when the multiscopic optical element is implemented as a parallax barrier, the pitch is a centre-to-centre distance between adjacent transparent slits in the parallax barrier.

The term "frequency component or repeating structure" in the frequency-domain representation of the given image refers to any distinguishable feature or its repetition that arise when the given image is transformed from the spatial domain to the frequency domain. Specifically, the frequency component can be understood to be a spectral feature at a particular location in the frequency domain representation of the given image. The frequency component could, for example, be a high-frequency component or a low-frequency component, depending on visual content represented in the given image. Furthermore, the repeating structure can be understood to be a spatially periodic pattern of a spectral feature, for example, such as in form of stripes, grid-like structures, radially distributed structures, in the frequency domain representation of the given image. It will be appreciated that the frequency component or repeating structure in the frequency-domain representation of the given image can be identified, for example, by employing a direct feature extraction technique. Such a direct feature extraction technique may be a spectral peak detection technique or other frequency-based pattern recognition technique.

Further, the periodic copies of the frequency component or repeating structure in the frequency-domain representation of the at least one captured image are identified using, for example, autocorrelation peaks in said frequency-domain representation or any suitable well-known image processing technique. It will be appreciated that the periodic copies in the frequency-domain representation of the at least one captured image can arise as a result of spatial aliasing effect, which is caused due to an incorrect value of the pitch of the multiscopic optical element. The term "periodic copies" of the frequency component or repeating structure refers to instances of a same frequency component or repeating structure appearing at regular intervals in frequency-domain representation of the at least one captured image.

The correct value of the pitch is determined using the distance between the adjacent ones of the periodic copies and the grid size of the frequency-domain representation of the at least one captured image. A technical benefit of this implementation is that it allows the at least one processor to determine the pitch with significant accuracy, in an automated manner. The term "grid size" refers to a resolution of the frequency-domain representation of the at least one captured image i.e., a number of pixels along a given axis of the frequency-domain representation.

In an example implementation, the correct value of the pitch can be determined using following mathematical expression:

$$P = S/D,$$

wherein
"P" refers to the pitch;
"S" refers to the grid size of the frequency-domain representation of the at least one captured image; and
"D" refers to the distance between the adjacent ones of the periodic copies.

For illustration purposes only, there will now be considered an example wherein the grid size of the frequency-domain representation of the at least one captured image is 512-pixels, while the distance between the adjacent ones of the periodic copies is 85.3-pixels. Using the aforesaid mathematical expression, the correct value of the pitch is determined as 6-pixels.

It is to be noted that the aforesaid mathematical expression is applicable for a particular scenario, for example, such as when the at least one camera is arranged at an optical infinity from the multiscopic display (namely, when the at least one camera is arranged significantly far from the multiscopic display). Therefore, in this scenario, the determined correct value of the pitch can be understood to be an observed value of the pitch. Since in real-world scenarios, the at least one camera is not likely arranged at the optical infinity, the determined correct value of the pitch requires additional compensation to account for: (i) a distance at which the at least one camera is arranged from the display area, (ii) an offset between a surface of the multiscopic optical element and a surface of the display area of the multiscopic display, said offset being a thickness of the multiscopic optical element, and (iii) a refractive index of a material of the multiscopic optical element. It will be appreciated that the additional compensation could also account for factors other than those mentioned hereinabove.

In this regard, the at least one processor is further configured to determine an actual value (namely, a physical value) of the pitch, by compensating the observed value of the pitch. This is because the observed value of the pitch is an apparent value of the pitch derived from a geometric projection of the actual value of the pitch, as perceived by the at least one camera positioned at a given distance from the multiscopic display. Due to the fact that a surface of the multiscopic optical element is spatially offset from a surface of the multiscopic display, this offset being the thickness of the multiscopic optical element, light rays projected from the multiscopic display through the multiscopic optical element will intersect the at least one camera's focal plane in a way that causes angular distortion due to which the at least one camera captures an observed pitch that deviates from a true, physical pitch. Such a deviation can be represented as a function of: (i) the distance at which the at least one camera is arranged from the display area, (ii) the offset between the surface of the multiscopic optical element and the surface of display area of the multiscopic display, said offset being the thickness of the multiscopic optical element, and (iii) the refractive index of the material of the multiscopic optical element. Accordingly, the actual value of the pitch can be determined by applying a geometrical compensation function that corrects the observed value of the pitch using the aforesaid known values. In mathematical terms, such compensation can be understood conceptually as solving an inverse projection geometry, wherein the actual value of the pitch is derived from the observed value of the pitch using trigonometric or ray tracing relationships that model angular deflection caused by optical geometry. By employing this compensation strategy, the system ensures that the calibration does not rely solely on assumptions about idealised imaging conditions (for example, arranging the plurality of camera at the optical infinity), and instead incorporates real-world optical constraints into determination of the correct value of the pitch. This enhances calibration accuracy, especially in compact setups or non-telecentric arrangements, and is essential for applications requiring precision multiscopic rendering under varying physical configurations.

Optionally, the at least one parameter comprises an orientation of the multiscopic optical element, wherein when determining the correct value of the at least one parameter, the at least one processor is configured to:
identify a frequency component or repeating structure in the frequency-domain representation of the displayed image;

identify periodic copies of the frequency component or repeating structure in the frequency-domain representation of the at least one captured image;

determine a direction in which the periodic copies lie in the frequency-domain representation of the at least one captured image; and determine a correct value of the orientation based on the direction in which the periodic copies lie.

The term "orientation" of the multiscopic optical element refers to a rotational alignment of the multiscopic optical element with respect to a pixel array of the multiscopic display. In other words, the orientation is a rotation of a longitudinal axis (i.e., a Y-axis) of the multiscopic optical element with respect to a longitudinal axis (i.e., a Y-axis) of the pixel array, specifically, about a Z-axis (namely, a depth axis) of the multiscopic display. It will be appreciated that in a typical implementation, the longitudinal axis of the multiscopic optical element is slightly aligned (for example, such as by 6 degrees) with respect to the longitudinal axis of the pixel array, for minimising visual artifacts (for example, such as aliasing effects or colour fringing).

Optionally, when determining the direction in which the periodic copies lie, the at least one processor is configured to determine a direction vector in the frequency-domain representation, wherein a magnitude of the direction vector corresponds to the pitch, and an angle of the direction vector (relative to a horizontal frequency axis or a vertical frequency axis of the frequency-domain representation) corresponds to the orientation of the multiscopic optical element. It will be appreciated that the direction vector can be determined by employing geometric techniques or spectral analysis techniques, for example, such as an autocorrelation peak mapping technique or an angular spectrum estimation technique. Thus, it can be inferred that a directional alignment of the periodic copies directly encodes a rotational angle between the multiscopic optical element and the pixel grid. For example, when the periodic copies are replicated along a direction that is 6 degrees from the vertical frequency axis, this would indicate that the multiscopic optical element has an angular offset (i.e., the orientation) of 6 degrees with respect to the longitudinal axis of the pixel array.

Determining the correct value of the orientation of the multiscopic optical element is essential for ensuring that displayed content is projected toward correct viewing directions. A misaligned multiscopic optical element can cause perceptual defects, such as ghosting between views or inaccurate parallax, thereby compromising 3D depth perception and image fidelity. Automated, frequency-domain-based determination of the orientation (as explained hereinabove) allows for robust and continuous calibration even in presence of small angular misalignments, ensuring that the multiscopic display continues to operate with high visual accuracy without requiring manual adjustment.

Further, optionally, the at least one parameter comprises a pitch and a thickness of the multiscopic optical element, wherein the at least one camera comprises a plurality of cameras that are arranged at different distances from the display area, the at least one captured image comprising a plurality of captured images of the display area, wherein when determining the correct value of the at least one parameter, the at least one processor is configured to:

identify a frequency component or repeating structure in the frequency-domain representation of the displayed image;

identify periodic copies of the frequency component or repeating structure in each of respective frequency-domain representations of the plurality of captured images;

determine respective observed values of the pitch corresponding to the plurality of captured images, based on respective distances between adjacent ones of the periodic copies in the respective frequency-domain representations and a grid size of the respective frequency-domain representations; and determine a correct value of thickness based on the different distances at which the plurality of cameras are arranged from the display area and the respective observed values of the pitch corresponding to the plurality of captured images.

The term "thickness" of the multiscopic optical element refers to a physical thickness of the multiscopic optical element. It will be appreciated that when the image is generated based on the (physical) thickness of the multiscopic optical element, the at least one processor may also take into account an optical thickness of the multiscopic optical element which depends on a refractive index of a material of the multiscopic optical element. This is because the optical thickness can alter how light bends and affects an autostereoscopic effect for which the multiscopic optical element is employed. Further, as discussed earlier, the observed value of the pitch is a value of the pitch that is perceived by the at least one camera, and depends not only on a value of a physical pitch (namely, an actual pitch) of the multiscopic optical element, but also on the thickness of the multiscopic optical element, the distance at which the at least one camera is arranged from the display area, and the refractive index of the material of the multiscopic optical element. It will be appreciated that the respective observed values of the pitch can be determined in similar manner, as discussed earlier, i.e., using the aforesaid mathematical expression.

Different cameras from amongst the plurality of cameras captures different views of the display area, and frequency-domain representations of different captured images are generated. These frequency-domain representations are different from each other due to perspective-induced aliasing effects, and more specifically, due to how the multiscopic optical element projects light differently depending on a distance of a given camera from the multiscopic display, and a viewing position and orientation of the given camera. Moreover, in real-world conditions, each camera from amongst the plurality of cameras, by virtue of its particular distance from the multiscopic display and the viewing position and orientation, would perceive a slightly different observed pitch corresponding to an image captured by said camera. It is noteworthy that such differences in the respective observed values of the pitch are a function of the thickness, and therefore can be inverted mathematically to solve for the correct value of the thickness. In this regard, when determining the correct value of the thickness, the at least one processor can utilise: (i) the different distances at which the plurality of cameras are arranged, (ii) the respective observed values of the pitch, and (iii) the refractive index of the material of the multiscopic optical element, as an input to solve a system of equations in which a common unknown variable to be determined is the thickness. The correct value of the thickness is the one that makes all the observed values of the pitch internally consistent with a single underlying value of the physical pitch. A technical benefit of this implementation it eliminates thickness-related distortions/artifacts, enhances visual quality of images displayed via the multiscopic display, and ensures reliable calibration for optimal performance of the multiscopic display.

It will be appreciated that the aforesaid manner of determining the thickness can be fully automated without user intervention and without requiring display of multiscopic images to the user's eyes. While the thickness of the multiscopic optical element may be known during production or factory calibration, certain use cases may benefit from determining or refining the thickness on-the-fly during real-time operation of the multiscopic display. For example, environmental factors such as ambient temperature changes or mechanical deformation may introduce variation in the thickness, impacting the calibration of the pitch. Accordingly, on-the-fly refinement of the thickness may improve calibration accuracy and image quality. In some implementations, the at least one camera comprises a single camera that can be positioned at different distances from the display area, and the aforesaid processing steps can be repeated for different positions of the single camera.

Optionally, the at least one parameter comprises a phase of the multiscopic optical element, wherein when determining the correct value of the at least one parameter, the at least one processor is configured to:

identify a phase component in the frequency-domain representation of the at least one captured image; and determine a correct value of the phase based on the identified phase component.

The term "phase" of the multiscopic optical element refers to a lateral alignment (namely, a lateral shift or offset) between the multiscopic optical element and the (underlying) pixel array of the multiscopic display. In some cases, the phase of the multiscopic optical element is measured as a fraction of the pitch of the multiscopic optical element.

Further, the term "phase component" refers to a complex argument (namely, an angular part) of frequency-domain coefficients derived from the frequency-domain representation of the at least one captured image. In this regard, when identifying the phase component, the at least one processor can analyse complex values in the frequency-domain representation of the at least one captured image. Once the phase component is identified, the at least one processor determines the correct value of the phase by interpreting an angular displacement observed in the frequency-domain representation and relating it back to a spatial offset between the multiscopic optical element and the pixel grid.

Beneficially, determining the correct value of the phase ensures that each subpixel in the pixel grid aligns with its intended part of the multiscopic optical element, thereby improving view separation, depth accuracy, and image clarity in multiscopic image rendering. Moreover, the use of frequency-domain phase analysis enables the system to extract the correct value of the phase precisely and robustly, without requiring special calibration settings. A flexibility to determine the phase directly i.e., via spectral analysis, makes the system computationally adaptable and capable of operating under a variety of practical constraints.

Additionally, optionally, the at least one parameter comprises a pitch, an orientation, a thickness and a phase of the multiscopic optical element, wherein when determining the correct value of the at least one parameter, the at least one processor is configured to:

select an estimated value of the phase of the multiscopic optical element;

calculate at least one expected image of the display area that is expected to be captured by the at least one camera during display of the image, based on the displayed image, a correct value of the pitch, a correct value of the orientation, a correct value of the thickness, the estimated value of the phase, and an optical location of the at least one camera relative to the display area;

determine whether the at least one expected image matches the at least one captured image of the display area; and when it is determined that the at least one expected image matches the at least one captured image, consider the estimated value of the phase as a correct value of the phase.

This implementation sets forth a strategy for determining the correct value of the phase, given that the correct value of the pitch, the correct value of the orientation, and the correct value of the thickness are assumed to be already determined with significant accuracy. This involves generating the at least one expected image of the display area, and comparing the at least one expected image with the at least one captured image to determine the correct value of the phase.

It will be appreciated that the estimated value of the phase is a closest possible guess for the correct value of the phase. The estimated value may be selected based on pre-defined sampling intervals (for example, such as sampling every 90 degrees of a full phase cycle). The step of selecting the estimated phase is performed prior to performing the step of calculating the at least one expected image and the step of capturing the at least one image.

The term "expected image" refers to a simulated image that the at least one camera would capture, based on the displayed image, the correct value of the pitch, the correct value of the orientation, the correct value of the thickness, the estimated value of the phase, and the optical location. In other words, the at least one expected image can be understood to be a theoretical outcome for a given set of parameter values, allowing the system to compare it with the at least one captured image, to assess accuracy of those parameters during calibration.

Once the displayed image, the correct value of the pitch, the correct value of the orientation, the correct value of the thickness, the estimated value of the phase, and the optical location are known, the phase of the multiscopic optical element is the only remaining parameter affecting the at least one expected image. By calculating the at least one expected image for a given expected value of the phase, and comparing it to its corresponding captured image of the display area, the at least one processor can determine whether said given estimated value of the phase produces results closest to the at least one captured image, without relying on manual adjustment or exhaustive image capture. The step of determining whether the at least one expected image matches the at least one captured image can be performed using any suitable well-known technique, for example, such as an image correlation technique, a structural similarity index (SSIM)-based technique, or similar.

A technical benefit of this implementation is that it allows for efficient and accurate determination of the correct value of the phase, using only a limited number of comparisons between the at least one expected image and the at least one captured image. This streamlines the calibration process, reduces computational and operational overhead, and ensures that the multiscopic display is optimally aligned for high-quality image rendering. This approach is flexible and can be implemented using various correlation or matching techniques, making it robust and adaptable for different system configurations.

Additionally, optionally, when determining the correct value of the at least one parameter, the at least one processor is configured to:

when it is determined that the at least one expected image does not match the at least one captured image, iteratively perform:

selecting another estimated value of the phase; and calculating at least one another expected image of the display area, based on the another estimated value of the phase, until the at least one another expected image matches the at least one captured image or a maximum number of iterations has reached.

This implementation enables the system to determine the correct value of the phase by iteratively refining the estimated value of the phase. If it is determined that the at least one expected image does not match the at least one captured image, the at least one another estimated value of the phase is selected and the at least one another expected image of the display area is calculated, repeating this process until a match is found or the maximum number of iterations is reached. This iterative approach is beneficial because the correct value of the phase may not be known in advance, and a single comparison may not yield a match. By systematically testing multiple estimated values of the phase and comparing resulting expected images to the at least one captured image, the system can reliably converge on the correct value of the phase, even in complex or ambiguous calibration scenarios. This ensures robust and accurate calibration of the phase, even when an initial estimate for the phase is incorrect. The iterative process increases a likelihood of ascertaining a true phase value, thereby improving reliability and precision of the calibration.

In some implementations, a discrete set of estimated values of the phase (for example, sampled over 360 degrees) may be pre-selected, or the iteration may proceed adaptively based on prior matching results. Importantly, this iterative process does not require capturing new images for each estimated value of the phase rather, the at least one captured image remains same, and only the at least one expected image is re-calculated based on each estimated value of the phase.

In some implementations, optionally, the system further comprises a tracker, wherein the at least one processor is configured to:

determine an optical location of each eye of at least one user relative to the display area, using the tracker;

select an estimated value of the at least one parameter of the multiscopic optical element; and generate the image to be displayed via the multiscopic display, based on the estimated value of the at least one parameter and the optical location of each eye of the at least one user relative to the display area.

This implementation relates to on-the-fly calibration of the multiscopic display. It is noteworthy that typically, a correct value of the at least one parameter of the multiscopic optical element is not highly accurately known, for example, due to measurement inaccuracies arising from its extremely small magnitude. The estimated value of the at least one parameter is initially selected as a closest possible guess, and then can be refined towards the correct value using frequency-domain analysis (as discussed later in detail). The step of selecting the estimated value is required when performing the next step of generating the image (for example, in this case, the multiscopic image), for displaying intended images to the left eye and the right eye of the at least one user.

It is noteworthy that while the estimated value of the at least one parameter is used in generating the image, it is not necessarily used in determining the correct value of the at least one parameter. For example, in case of the pitch and the orientation, correct values of the pitch and the orientation are derived using the frequency-domain representation of the displayed image and the frequency-domain representation of the at least one captured image, independently of estimated values of the pitch and the orientation. However, by selecting the estimated value of the at least one parameter that is within a feasible range for the multiscopic optical element, the at least one processor ensures that frequency-domain analysis produces frequency components that fall within a range conducive to a high signal-to-noise ratio. This is a key enabler for performing the on-the-fly calibration, as it allows the system to begin displaying functional multiscopic content even while precise calibration parameters are still being resolved.

The step of generating the multiscopic image using the estimated value of the at least one parameter and the optical location can be performed using any suitable well-known technique. The term "multiscopic image" to refer to a light field image or an autostereoscopic image that, when displayed at the multiscopic display, produces a synthetic light field. Said synthetic light field presents different images to different eyes of the at least one user, meaning that the multiscopic image being displayed is not the same as what any individual eye directly perceives. The term "optical location" refers to a position of given eye of the at least one user with respect to the display area. The term "given eye" encompasses a left eye and a right eye of the at least one user. Optionally, the optical location is represented in a given coordinate space. As an example, the given coordinate space may be a Cartesian coordinate space.

Optionally, the tracker comprises at least one tracking camera employed to detect and/or track at least a position of the given eye of the at least one user. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a ToF camera, a LIDAR camera, an RGB-D camera, a laser rangefinder, a stereo camera, a plenoptic camera, a ranging camera, a SONAR camera.

Additionally, optionally, the at least one processor is configured to:

for a plurality of images that present virtual content across different regions of the display area, perform:

determining the optical location of each eye of the at least one user;

generating the plurality of images;

displaying the plurality of images via the multiscopic display, whilst capturing corresponding images of the display area using the at least one camera;

rectifying the corresponding captured images of the display area; and generating respective frequency-domain representations of the plurality of displayed images and respective frequency-domain representations of the corresponding captured images;

wherein the correct value of the at least one parameter of
   the multiscopic optical element is determined based
   further on the respective frequency-domain represen-
   tations of the plurality of displayed images and the
   respective frequency-domain representations of the
corresponding captured images.

This implementation extends the calibration process
across the different regions of the display area of the
multiscopic display, by utilising the plurality of images and
their corresponding captured images. This results in achieving calibration coverage across an entirety of the display
area, thereby compensating for potential localised inaccu-
racies due to manufacturing inaccuracies or other non-
uniformities in the multiscopic optical element.

Since each image in the plurality of images present virtual
content in a different region of the display area, this allows
the at least one processor to determine the correct value of
the at least one parameter of the multiscopic optical element
for the different regions of the display area. This is important
because in practical scenarios, certain portions of the multiscopic optical element may exhibit parameter deviations
due to manufacturing tolerances or thermal effects, and such
deviations can result in locally degraded image quality. By
displaying the virtual content in different regions of the
display area and performing calibration operations for each
such region, the system accumulates spatially distributed
calibration data. This allows the at least one processor to
perform globally accurate or regionally compensated cali-
bration of the multiscopic optical element in a highly
accurate manner. As a result, regardless of where future
virtual content is displayed on the multiscopic display, the
system can maintain uniform image fidelity and visual
accuracy for the at least one user. This approach supports
on-the-fly, continuous calibration across an entire usable
display area, with minimal visual intrusion, thus enhancing
robustness and user experience of multiscopic rendering
systems in real-world use. The step of displaying the plu-
rality of images, whilst capturing corresponding images, the
step of rectifying the corresponding captured images, the
step of generating frequency-domain representations, and
the step of determining the correct value of the at least one
parameter, are performed in a similar manner, as discussed
earlier in detail.

The term "virtual content" refers to a computer-generated
content (namely, a digital content or a virtual object) that is
to be presented to the given eye. In an example, the virtual
content may be a two-dimensional (2D) user interface (UI)
element. Such a 2D UI element could pertain to, for
example, a virtual navigation tool, a virtual gadget, a virtual
message, a virtual entity, a virtual entertainment media, a
virtual information, or similar. The virtual content could
alternatively be a 3D virtual content.

Furthermore, optionally, the at least one processor is
configured to:
   determine a subspace of an image space of the image that is not directed toward any eye of the at least one user,
      based on the estimated value of the at least one param-
      eter and the optical location of each eye of the at least
      one user relative to the display area; and
   when generating the image, modify the determined subspace of the image space to direct light toward the at
      least one camera, wherein the determined subspace of
      the image space is modified based on at least one of: a
      predefined pattern, a spatio-temporal noise pattern.

This implementation is an enhancement for on-the-fly calibration by leveraging a portion of the image space (i.e.,
the subspace) that is not visible to any eye of the at least one user. This is because light from the subspace is not directed
towards the at least one user, and thus can be repurposed to
enhance calibration fidelity. Beneficially, this may allow the
system to: (i) gather calibration data even from regions that
are currently unused for user content, (ii) maintain a seam-
less visual experience for the user while calibration is
ongoing, and (iii) improve accuracy and reliability in per-
forming the frequency-domain analysis on captured images,
especially in display regions where visual content may lack
sufficient high-frequency detail. The subspace can be under-
stood to be a linear region or a volumetric component of the
image space of the image, such that the light emitted from
said subspace does not intersect with any user's eye position.

It will be appreciated that the subspace of the image space
can be determined, for example, by applying geometric
projection logic based on the estimated value of the at least
one parameter and the known optical location of each eye of
the at least one user. This is possible because the at least one
parameter define how the multiscopic optical element maps
light emanating from (underlying) pixels or subpixels of the
multiscopic display to specific viewing directions. Using
this mapping and the known optical location of each eye, the
at least one processor can calculate which rays of light (i.e.,
directional components of the image space) will not intersect
with any eye. These rays of light correspond to the subspace
of the image space that is effectively invisible to the user.
Once the subspace is determined, the at least one processor
modifies visual content of the subspace (by adding the at
least one of: the predefined pattern, the spatio-temporal
noise pattern) to redirect its light toward the at least one
camera for the purpose of frequency-domain analysis, with-
out degrading user-perceived visual quality.

A technical benefit of modifying the determined subspace
of the image space by adding the at least one of: the
predefined pattern, the spatio-temporal noise pattern, lies in
enhancing calibration quality without affecting user's visual
experience. Since the subspace is not directed toward any
eye of the user, embedding structured or noise-based pat-
terns within the subspace introduces high-frequency visual
features that are captured solely by the at least one camera.
These features significantly improve the signal-to-noise
ratio in the frequency-domain analysis, thereby enabling
precise and robust estimation of the correct value of the at
least one parameters, particularly, in display regions where
user-facing content may lack sufficient texture or contrast for
accurate measurement. The predefined pattern may include
known high-frequency visual structures such as grids,
stripes, or other repeating geometries. The spatio-temporal
noise pattern can be any one of: a flickering white noise
pattern, a temporally shifting stripes pattern, a dynamic
Perlin noise pattern, a time-varying speckle pattern, a blue
noise pattern, an oscillating dot matrix pattern.

One way of determining which pattern to use for modi-
fying the determined subspace of the image space, based on
current uncertainty in the at least one parameter, is
described, for example, in "Bayesian adaptive estimation:
The next dimension" by Janne V. Kujalaa, and Tuomas J.
Lukka, published in Journal of Mathematical Psychology,
Vol. 50, Issue 4, pp. 369-389, February 2006, which has
been incorporated herein by reference.

Optionally, the image includes a spatio-temporal noise
pattern. In this regard, instead of only modifying the sub-
space of the image space by adding the spatio-temporal
noise pattern therein (as discussed earlier), an entirety of the
image can also comprise the spatio-temporal noise pattern.
A technical benefit of this is that it enhances robustness and
effectiveness of frequency-domain analysis used in the calibration of the at least one parameter of the multiscopic optical element. This is because an inclusion of the spatio-temporal noise pattern ensures that the displayed image always contains considerable high-frequency components across time and space, even when an original visual content may be low in texture or visual detail (for example, having flat-coloured regions). This guarantees that, during normal system operation, the at least one captured image of the display area would comprise frequency-domain features that can be analysed reliably by the at least one processor to determine or refine the at least one parameters. By distributing noise over space and time, rather than having a single static pattern, the system avoids introducing perceptible visual artifacts to the user, while still achieving spectral richness needed for accurate calibration. This approach enables continuous, background calibration without degrading the user's viewing experience, and ensures that the calibration remains effective under varying visual content and usage conditions.

Optionally, the system further comprises an optical combiner arranged on an optical path of the multiscopic display, wherein the at least one camera is positioned such that a region of the display area lies within the field of view of the at least one camera both directly and via reflection from the optical combiner, and wherein the at least one processor is configured to:

extract a first image segment from the at least one captured image of the display area corresponding to a direct view of the region of the display area;

extract a second image segment from the at least one captured image corresponding to a reflected view of the region of the display area;

and when rectifying, crop the first image segment and the second image segment; and when generating frequency-domain representations, generate a first frequency-domain representation corresponding to the first image segment and a second frequency-domain representation corresponding to the second image segment;

wherein the correct value of the at least one parameter of the multiscopic optical element is determined based further on the first frequency-domain representation and the second frequency-domain representation.

In this regard, by extracting the first image segment that corresponds to the direct view of the region, the at least one processor analyses only a portion of the at least one captured image that corresponds to a line-of-sight optical path between the at least one camera and the display area, free of any reflection-induced distortions. By isolating the first image segment, the at least one processor ensures that frequency-domain analysis is applied to spatial data that is geometrically straightforward, which is useful for establishing a reliable baseline measurement. Similarly, the second image segment that corresponds to the reflected view of the same region, would represent same visual content, but from a different viewing angle, due to a reflection path. While reflections may introduce minor optical distortions or brightness variations, geometric difference in viewpoint provides an additional data point for frequency-domain analysis, enabling cross-verification of calibration parameters. The steps of extracting the first image segment and the second image segment can be performed using any suitable well-known technique.

During the rectification step, cropping isolates the first image segment and the second image segment from surrounding visual clutter or irrelevant parts of the at least one captured image, ensuring that subsequent rectification and frequency-domain transformations are based purely on visual content of interest. This increases the signal-to-noise ratio in resulting frequency-domain representations and enhances accuracy of aliasing detection. The step of generating the frequency-domain representations is performed in a same manner, as discussed earlier in detail. It will be appreciated that in some implementations any one of: the first image segment, the second image segment, can also be used for performing calibration.

A technical benefit determining the correct value of the at least one parameter using the first frequency-domain representation and the second frequency-domain representation is that it enhances calibration accuracy and robustness. This is achieved by using multiple optical viewpoints of the same region of the display area, one direct and another reflected, captured simultaneously by the at least one camera. Differences or consistencies in spectral patterns represented in the frequency-domain representations can reveal subtle distortions, misalignments, or optical asymmetries that may otherwise go undetected. Analysing both the first frequency-domain representation and the second frequency-domain representation increases robustness of calibration, particularly in detecting and compensating for depth-related distortions introduced by the optical combiner or a viewing geometry. Moreover, by incorporating both the direct view and the reflected view, the system obtains redundant or corroborative spectral evidence, which strengthens reliability of the calibration outcome and reduces a likelihood of localised measurement errors caused by noise, occlusion, or asymmetrical reflections. Additionally, a multi-view analysis can allow for a reliable estimation of geometric parameters of the multiscopic optical element, even in complex optical configurations such as augmented reality (AR) systems with partially reflective optical combiners. This enables stable and accurate multiscopic image rendering.

For illustration purposes only, there will now be described how various components of the system can be implemented. The at least one processor controls an overall operation of the system. The at least one processor is communicably coupled to the multiscopic display and the at least one camera. Optionally, the at least one processor is implemented as a processor of the multiscopic display. Alternatively, optionally, the at least one processor is implemented as a processor of a computing device that is communicably coupled to the multiscopic display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

It will be appreciated that the system and the method can be implemented, for example, in a vehicle. The vehicle could, for example, be a car, a truck, an aircraft, a speed boat or the like. Optionally, in this regard, the multiscopic display is arranged on a dashboard of the vehicle, and the optical combiner is optionally implemented using a transparent portion of a windshield of the vehicle. It will be appreciated that there may be some cases where the multiscopic display may be arranged on a roof of the vehicle, but not on the dashboard of the vehicle. Similarly, the optical combiner may be implemented using a pull-down reflector or similar, but not using the windshield of the vehicle. In an example, when the system is implemented in the aircraft, the multiscopic display may be roof-mounted, and may be employed to display locations of other aircrafts that are in a vicinity of said aircraft.

Optionally, the at least one camera comprises at least one of: at least one visible-light camera, at least one infrared (IR) camera, at least one depth camera. Example implementations of all such types of cameras have been already discussed earlier.

In some implementations, the multiscopic display can be implemented as a light field display unit. Pursuant to embodiments of the present disclosure, different types of light field display units can be implemented. For example, the light field display unit can be any one of: a hogel-based light field display unit, a lenticular array-based light field display unit, a parallax barrier-based light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display. When the multiscopic display is implemented as a light field display unit, the multiscopic image is generated as a light field image.

Throughout the present disclosure, the term "multiscopic optical element" of the multiscopic display refers to a specialised optical element that is capable of directing light rays incident thereupon in different directions simultaneously. This allows the multiscopic optical element to present a multiscopic view to a user without any need for her/him to wear 3D glasses. Optionally, the multiscopic optical element is implemented as any one of: a parallax barrier, a lenticular array. The multiscopic optical element can be static or actively controllable. The multiscopic optical element and its forms are well-known in the art. It will be appreciated that an alternative to the aforementioned conventional multiscopic optical element, the multiscopic display may comprise a specialised backlight unit comprising a first layer of lenticulars, a diffuser layer, and a second layer of lenticulars. The first layer of lenticulars focuses light emitted by an addressable light-emitting diode (LED) matrix, concentrating the light into near-singular light points on a subsequent diffuser layer. The diffuser layer is arranged to receive the focused light from the first layer of lenticulars, and serves as an emission surface for light points. The second layer of lenticulars directs the light emitted by the diffuser layer toward specific directions. A steering of the light's direction is achieved by selectively activating specific LEDs within the addressable LED matrix. By leveraging such a configuration, the specialised backlight unit produces steerable collimated light, which is then passed through a traditional LCD panel. The LCD panel is capable of generating a full-resolution colour image, while stereoscopy or multiscopy is realised via temporal multiplexing. The temporal multiplexing allows alternating image frames to be directed toward different eyes (for example, one image frame towards a left eye and a next image frame towards a right eye) of the user, thus enabling depth perception without relying on the conventional multiscopic optical elements. Such a specialised backlight unit is described, for example, in "*Modeling and optimizing through plenoptic function for the dual lenticular lens-based directional autostereoscopic display system*" by Xueling Li, Shengzhi Qiang, Yuanqing Wang, and Xicai Li, published in Optics Express, Vol. 32, Issue 7, pp. 10925-10940, 2024, which has been incorporated herein by reference.

The term "optical combiner" refers to a specialised equipment that is capable of reflecting light rays from the display area of the multiscopic display towards a given user, when the optical combiner is arranged on the optical path of the multiscopic display. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to an image plane of the multiscopic display lies in a range of 10 degrees to 75 degrees.

The present disclosure also relates to the method as described above. Various embodiments and variants disclosed above, with respect to the aforementioned first aspect, apply mutatis mutandis to the method.

Optionally, in the method, the at least one parameter comprises a pitch of the multiscopic optical element, wherein the step of determining the correct value of the at least one parameter comprises:

identifying a frequency component or repeating structure in the frequency-domain representation of the displayed image;

identifying periodic copies of the frequency component or repeating structure in the frequency-domain representation of the at least one captured image; and determining a correct value of the pitch based on a distance between adjacent ones of the periodic copies and a grid size of the frequency-domain representation of the at least one captured image.

Optionally, in the method, the at least one parameter comprises an orientation of the multiscopic optical element, wherein the step of determining the correct value of the at least one parameter comprises:

identifying a frequency component or repeating structure in the frequency-domain representation of the displayed image;

identifying periodic copies of the frequency component or repeating structure in the frequency-domain representation of the at least one captured image;

determining a direction in which the periodic copies lie in the frequency-domain representation of the at least one captured image; and determining a correct value of the orientation based on the direction in which the periodic copies lie.

Optionally, in the method, the at least one parameter comprises a pitch and a thickness of the multiscopic optical element, wherein the at least one camera comprises a plurality of cameras that are arranged at different distances from the display area, the at least one captured image comprising a plurality of captured images of the display area, wherein the determining the correct value of the at least one parameter comprises:

identifying a frequency component or repeating structure in the frequency-domain representation of the displayed image;

identifying periodic copies of the frequency component or repeating structure in each of respective frequency-domain representations of the plurality of captured images;

determining respective observed values of the pitch corresponding to the plurality of captured images, based on respective distances between adjacent ones of the periodic copies in the respective frequency-domain representations and a grid size of the respective frequency-domain representations; and determining a correct value of thickness based on the different distances at which the plurality of cameras are arranged from the display area and the respective observed values of the pitch corresponding to the plurality of captured images.

Optionally, in the method, the at least one parameter comprises a phase of the multiscopic optical element, wherein the step of determining the correct value of the at least one parameter comprises:

identifying a phase component in the frequency-domain representation of the at least one captured image; and determining a correct value of the phase based on the identified phase component.

Additionally, optionally, in the method, the at least one parameter comprises a pitch, an orientation, a thickness and a phase of the multiscopic optical element, wherein the step of determining the correct value of the at least one parameter comprises:

selecting an estimated value of the phase of the multiscopic optical element;

calculating at least one expected image of the display area that is expected to be captured by the at least one camera during display of the image, based on the displayed image, a correct value of the pitch, a correct value of the orientation, a correct value of the thickness, the estimated value of the phase, and an optical location of the at least one camera relative to the display area;

determining whether the at least one expected image matches the at least one captured image of the display area; and when it is determined that the at least one expected image matches the at least one captured image, considering the estimated value of the phase as a correct value of the phase.

Optionally, when determining the correct value of the at least one parameter, the method further comprises:

when it is determined that the at least one expected image does not match the at least one captured image, iteratively performing:

selecting another estimated value of the phase; and calculating at least one another expected image of the display area, based on the another estimated value of the phase, until the at least one another expected image matches the at least one captured image or a maximum number of iterations has reached.

Optionally, the method further comprises:

determining an optical location of each eye of at least one user relative to the display area, using a tracker;

selecting an estimated value of the at least one parameter of the multiscopic optical element; and generating the image to be displayed via the multiscopic display, based on the estimated value of the at least one parameter and the optical location of each eye of the at least one user relative to the display area.

Additionally, optionally, the method further comprises:

for a plurality of images that present virtual content across different regions of the display area, performing:

determining the optical location of each eye of the at least one user;

generating the plurality of images;

displaying the plurality of images via the multiscopic display, whilst capturing corresponding images of the display area using the at least one camera;

rectifying the corresponding captured images of the display area; and generating respective frequency-domain representations of the plurality of displayed images and respective frequency-domain representations of the corresponding captured images, wherein the correct value of the at least one parameter of the multiscopic optical element is determined based further on the respective frequency-domain representations of the plurality of displayed images and the respective frequency-domain representations of the corresponding captured images.

Optionally, the method further comprises:

determining a subspace of an image space of the image that is not directed toward any eye of the at least one user, based on the estimated value of the at least one parameter and the optical location of each eye of the at least one user relative to the display area; and when generating the image, modifying the determined subspace of the image space to direct light toward the at least one camera, wherein the determined subspace of the image space is modified based on at least one of: a predefined pattern, a spatio-temporal noise pattern.

Optionally, in the method, the image includes a spatio-temporal noise pattern.

Optionally, the at least one camera is positioned such that a region of the display area lies within the field of view of the at least one camera both directly and via reflection from an optical combiner that is arranged on an optical path of the multiscopic display, wherein the method further comprises:

extracting a first image segment from the at least one captured image of the display area corresponding to a direct view of the region of the display area;

extracting a second image segment from the at least one captured image corresponding to a reflected view of the region of the display area; and when rectifying, cropping the first image segment and the second image segment; and when generating frequency-domain representations, generating a first frequency-domain representation corresponding to the first image segment and a second frequency-domain representation corresponding to the second image segment;

wherein the correct value of the at least one parameter of the multiscopic optical element is determined based further on the first frequency-domain representation and the second frequency-domain representation.

DETAILED DESCRIPTION OF THE DRAWINGS

Referring to FIG. 1, illustrated is a simplified example implementation of a system 100 for automated calibration of a multiscopic display 102 using frequency domain, in accordance with an embodiment of the present disclosure. The system 100 is shown to be implemented, for example, in a vehicle 104. The vehicle 104 could, for example, be a car, a truck, an aircraft, a speed boat or the like. The system 100 comprises the multiscopic display 102, at least one camera (for example, depicted as a camera 106), and at least one processor (for example, depicted as a processor 108). The camera 106 is shown to be positioned in a manner that a display area 110 of the multiscopic display 102 lies at least partially within a field of view of the camera 106. A user 112 is shown to be seated on a seat 114 of the vehicle 104. Optionally, the system 100 further comprises an optical combiner 116 and a tracker 118. The optical combiner 116 is shown to be arranged on an optical path of the multiscopic display 102. Optionally, in this regard, the optical combiner 116 is integrated into a windshield (not shown) of the vehicle 104. The tracker 118 is shown to be implemented, for example, as a tracking camera. It is to be noted that FIG. 1 shows a side view of the vehicle 104, for sake of simplicity only. Due to this, the display area 110 of the multiscopic display 102 and the optical combiner 116 are shown from a side. In reality, from a perspective of a pose of the camera 106, the display area 110 and the optical combiner 116 will appear as two-dimensional surfaces only. The processor 108 is configured to perform various operations, as described earlier with respect to the aforementioned first aspect.

It may be understood by a person skilled in the art that FIG. 1 includes a simplified example implementation of the system 100, for sake of clarity, which should not unduly limit the scope of the claims herein. It is to be understood that the specific implementation of the system 100 is provided as an example and is not to be construed as limiting it to specific numbers or types of multiscopic displays, cameras, optical combiners, and processors. The person skilled in the art will recognize many variations, alternatives, and modifications of embodiments of the present disclosure.

Figure 2:
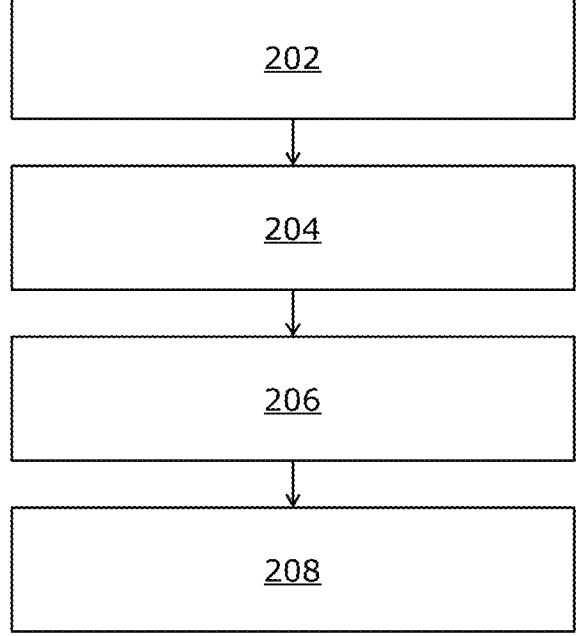
FIG. 2 illustrates steps of a method for automated calibration of a multiscopic display using frequency domain, in accordance with an embodiment of the present disclosure.

Referring to FIG. 2, illustrated are steps of a method for automated calibration of a multiscopic display, in accordance with an embodiment of the present disclosure. At step 202, an image is displayed via a multiscopic display, whilst at least one image of a display area of the multiscopic display is captured using at least one camera, wherein the at least one camera is positioned such that the display area lies at least partially within a field of view of the at least one camera. At step 204, the at least one captured image of the display area is rectified to represent the display area only. At step 206, a frequency-domain representation of the displayed image and a frequency-domain representation of the at least one captured image of the display area, are generated, after rectifying. At step 208, a correct value of at least one parameter of a multiscopic optical element of the multiscopic display, is determined, based on the frequency-domain representation of the displayed image and the frequency-domain representation of the at least one captured image of the display area.

The aforementioned steps are only illustrative and other alternatives can also be provided where one or more steps are added, one or more steps are removed, or one or more steps are provided in a different sequence without departing from the scope of the claims.

Figure 3A:
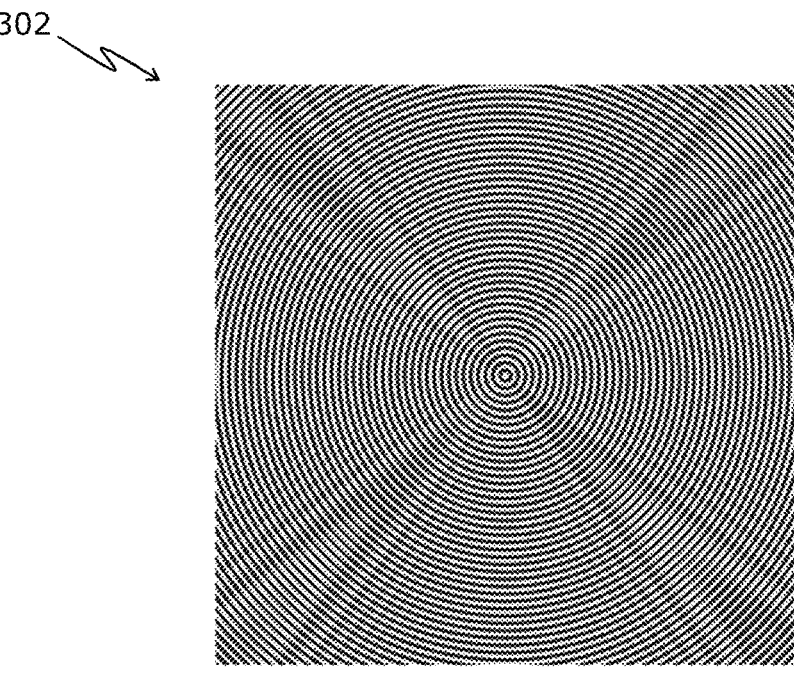
FIG. 3A illustrates an exemplary image displayed via a multiscopic display.
Figure 3B:
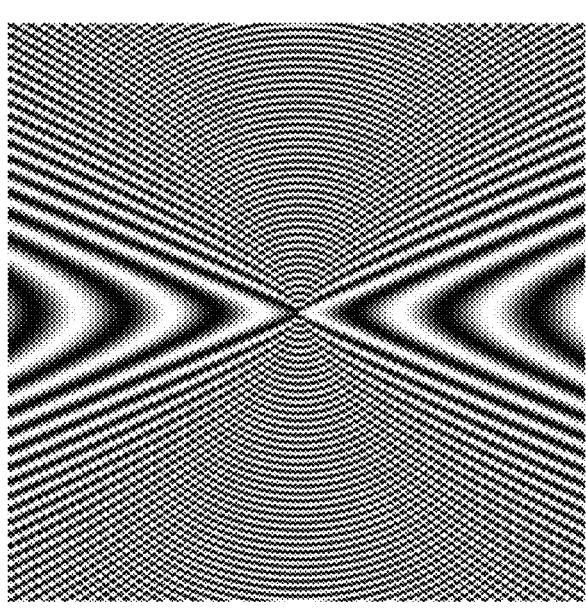
FIG. 3B illustrates an exemplary image of a display area of the multiscopic display that is captured using a camera.
Figure 3C:
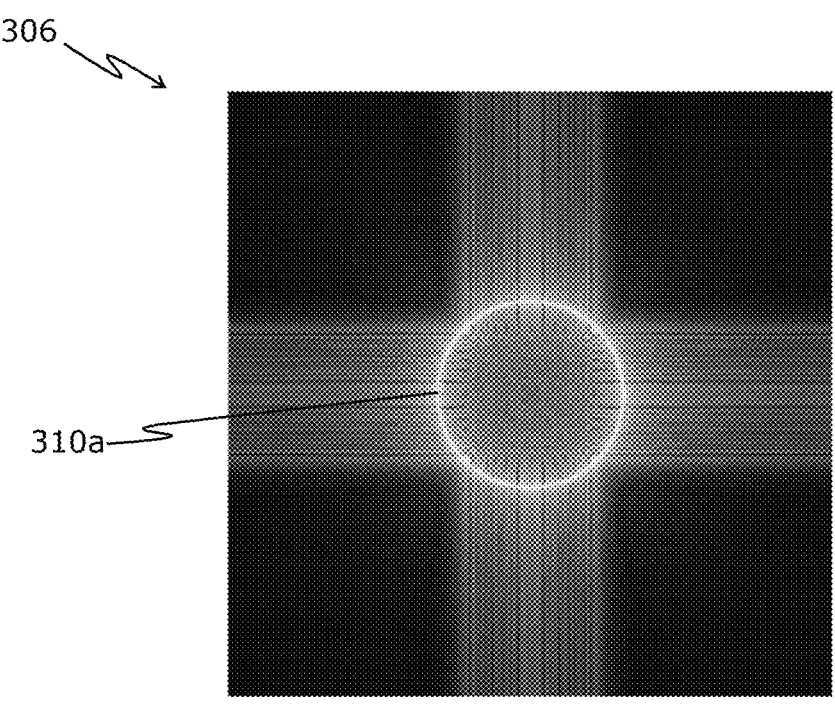
Figure 3D:
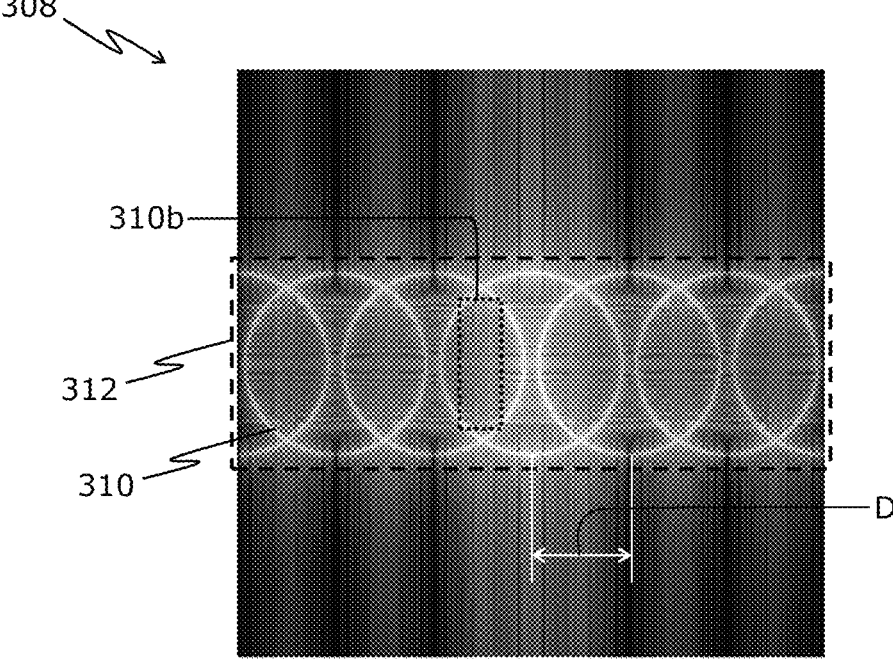
FIG. 3D illustrates an exemplary frequency-domain representation of the captured image, in accordance with an embodiment of the present disclosure.

Referring to FIGS. 3A, 3B, 3C, and 3D, FIG. 3A illustrates an exemplary image 302 displayed via a multiscopic display (not shown), FIG. 3B illustrates an exemplary image 304 of a display area (not shown) of the multiscopic display that is captured using a camera (not shown), FIG. 3C illustrates an exemplary frequency-domain representation 306 of the displayed image 302, while FIG. 3D illustrates an exemplary frequency-domain representation 308 of the captured image 304, in accordance with an embodiment of the present disclosure.

With reference to FIG. 3A, the displayed image 302 is shown, for example, as a standard image (namely, a non-multiscopic image) comprising a concentric ring pattern. It will be appreciated that when calibration of a multiscopic optical element (not shown) of the multiscopic display is to be performed separately, for example, during an initial setup of the multiscopic display or at regular intervals, the displayed image 302 is preferably displayed via the multiscopic display. However, when the calibration of the multiscopic display is to be performed on-the-fly (namely, in real time when the multiscopic display is actively in use), a multiscopic image is preferably displayed via the multiscopic display, the multiscopic image being generated based on optical locations of eyes of at least one user. With reference to FIG. 3B, the captured image 304 represents an aliased version of the concentric ring pattern represented in the displayed image 302, due to an incorrect value of at least one parameter (comprising at least one of: a pitch, an orientation, a thickness, a phase) of the multiscopic optical element.

In some implementations, with reference to FIG. 3C, the frequency-domain representation 306 of the displayed image 302 represents a frequency component or repeating structure 310a (for example, depicted as a white circular ring). In other implementations, with reference to FIG. 3D, there is also shown another frequency component or repeating structure 310b. Moreover, with reference to FIG. 3D, the frequency-domain representation 308 of the captured image 304 represents periodic copies 312 (for example, depicted as five white circular rings and two white semi-circular rings) of the frequency component or repeating structure 310a (for example, depicted as a white circular ring). It will be appreciated that a central region of the frequency-domain representation 308 (as shown in FIG. 3D) represents low-frequency visual details, while a peripheral region surrounding the central region represents higher-frequency visual details. Theoretically, periodic copies of a given frequency component or repeating structure appear repeatedly in a frequency-domain representation, both near its central region and peripheral region. However, in practical implementations, when a camera resolution is limited, higher-frequency regions (those which are farther from the center) often appear to be blurred, noisy, or indistinct, making it difficult to detect periodic features in those areas. Therefore, in real-world use, periodic copies are detected closer to the center of the frequency-domain representation (such as those low-frequency aliases inside the frequency component or repeating structure 310a in FIG. 3D) because they are more reliably captured by a camera.

With reference to FIGS. 3C and 3D, the frequency-domain representation 306 of the displayed image 302 and the frequency-domain representation 308 of the captured image 304 can be generated, for example, using a Fast Fourier Transform (FFT) technique, a Discrete Fourier Transform (DFT) technique, a wavelet transform technique, or any other spectral analysis-based technique. For illustration purposes only, the frequency-domain representation 306 and the frequency-domain representation 308 are generated as log-amplitude spectra of DFT of corresponding images.

Notably, a correct value of the at least one parameter of the multiscopic optical element is determined, based on the frequency-domain representation 306 of the displayed image 302 and the frequency-domain representation 308 of the captured image 304. There will now be described two separate example cases for determining a correct value of the pitch and determining a correct value of the orientation.

Case 1: The correct value of the pitch is determined based on a distance D between adjacent ones of the periodic copies 312 and a grid size of the frequency-domain representation 308 of the captured image 304. In an example implementation, the correct value of the pitch can be determined using following mathematical expression:

$$P = S/D,$$

wherein "P" refers to the pitch; "S" refers to the grid size of the frequency-domain representation 308 of the captured image 304; and "D" refers to the distance between the adjacent ones of the periodic copies 312.

For illustration purposes only, there will now be considered an example wherein the grid size of the frequency-domain representation 308 of the captured image 304 is 512-pixels, while the distance D between the adjacent ones of the periodic copies 312 is 85.3-pixels. Using the aforesaid mathematical expression, the correct value of the pitch is determined as 6-pixels.

Case 2: The correct value of the orientation is determined based on a direction in which the periodic copies 312 lie in the frequency-domain representation 308 of the captured image 304. In a typical implementation, a longitudinal axis (namely, a Y-axis) of the multiscopic optical element is slightly aligned (for example, such as by 6 degrees) with respect to a longitudinal axis of a pixel array of the multi-scopic display, for minimising visual artifacts (for example, such as aliasing effects or colour fringing). Therefore, in reality, when the longitudinal axis of the multiscopic optical element is slightly aligned with respect to the longitudinal axis of the pixel array, the periodic copies 312 would also lie at a non-zero angle (for example, such as 6 degrees) with respect to the horizontal direction. However, with reference to FIG. 3D, for sake of simplicity and convenience only, the periodic copies 312 are shown to lie in a horizontal direction only, instead of the non-zero angle with respect to the horizontal direction.

FIGS. 3A, 3B, 3C, and 3D are merely examples, which should not unduly limit the scope of the claims herein. A person skilled in the art will recognize many variations, alternatives, and modifications of embodiments of the present disclosure.

Figure 4:
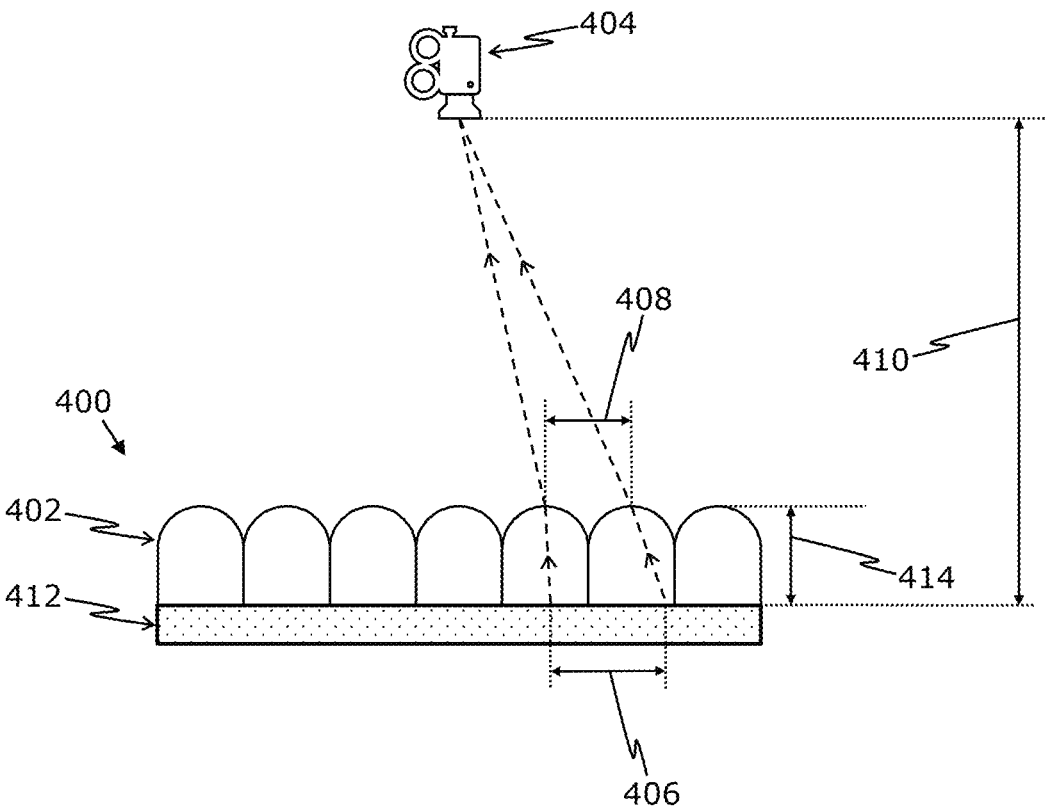
FIG. 4 illustrates an exemplary scenario of determining an actual pitch of a multiscopic optical element of a multiscopic display, in accordance with an embodiment of the present disclosure.

Referring to FIG. 4, illustrated is an exemplary scenario of determining an actual pitch of a multiscopic optical element 402 of a multiscopic display 400, in accordance with an embodiment of the present disclosure. It is to be noted that the aforesaid mathematical expression (as discussed in "Case 1" with reference to FIG. 3D hereinabove) is applicable for a particular scenario, for example, such as when a camera 404 is arranged at an optical infinity from the multiscopic display 400 (namely, when the camera 404 is arranged significantly far from the multiscopic display 400). Therefore, in this scenario, a determined pitch can be understood to be an observed pitch 406 of the multiscopic optical element 402. As shown in FIG. 4, in a real-world scenario, the camera 404 is not likely arranged at the optical infinity, and a processor (not shown) is configured to determine the actual pitch 408 (namely, a physical pitch of the multiscopic optical element 402), by compensating the observed pitch 406, based on (i) a distance 410 at which the camera 404 is arranged from a surface of a display area 412 (depicted using a dotted pattern) of the multiscopic display 400, (ii) a thickness 414 of the multiscopic optical element 402, and (iii) a refractive index of a material of the multi-scopic optical element 402.

FIG. 4 is merely an example, which should not unduly limit the scope of the claims herein. A person skilled in the art will recognize many variations, alternatives, and modi-fications of embodiments of the present disclosure.

The invention claimed is:

1. A system (100) comprising:
a multiscopic display;
at least one camera that is positioned such that a display area of the multiscopic display lies at least partially within a field of view of the at least one camera; and
at least one processor configured to:
display an image via the multiscopic display, whilst capturing at least one image of the display area using the at least one camera;
rectify the at least one captured image of the display area, to represent the display area only;

generate a frequency-domain representation of the dis-played image and a frequency-domain representation of the at least one captured image of the display area after rectifying; and
determine a correct value of at least one parameter of a multiscopic optical element of the multiscopic display, based on the frequency-domain representa-tion of the displayed image and the frequency-domain representation of the at least one captured image of the display area.

2. The system of claim 1, wherein the at least one parameter comprises a pitch of the multiscopic optical element, and wherein when determining the correct value of the at least one parameter, the at least one processor is configured to:
identify a frequency component or repeating structure in the frequency-domain representation of the displayed image;
identify periodic copies of the frequency component or repeating structure in the frequency-domain represen-tation of the at least one captured image; and
determine a correct value of the pitch based on a distance between adjacent ones of the periodic copies and a grid size of the frequency-domain representation of the at least one captured image.

3. The system of claim 1, wherein the at least one parameter comprises an orientation of the multiscopic opti-cal element, and wherein when determining the correct value of the at least one parameter, the at least one processor is configured to:
identify a frequency component or repeating structure in the frequency-domain representation of the displayed image;
identify periodic copies of the frequency component or repeating structure in the frequency-domain represen-tation of the at least one captured image;
determine a direction in which the periodic copies lie in the frequency-domain representation of the at least one captured image; and
determine a correct value of the orientation based on the direction in which the periodic copies lie.

4. The system of claim 1, wherein the at least one parameter comprises a pitch and a thickness of the multi-scopic optical element, wherein the at least one camera comprises a plurality of cameras that are arranged at differ-ent distances from the display area, the at least one captured image comprising a plurality of captured images of the display area,
wherein when determining the correct value of the at least one parameter, the at least one processor is configured to:
identify a frequency component or repeating structure in the frequency-domain representation of the dis-played image;
identify periodic copies of the frequency component or repeating structure in each of respective frequency-domain representations of the plurality of captured images;
determine respective observed values of the pitch cor-responding to the plurality of captured images, based on respective distances between adjacent ones of the periodic copies in the respective frequency-domain representations and a grid size of the respective frequency-domain representations; and
determine a correct value of thickness based on the different distances at which the plurality of cameras are arranged from the display area and the respective observed values of the pitch corresponding to the plurality of captured images.

5. The system of claim 1, wherein the at least one parameter comprises a phase of the multiscopic optical element, and wherein when determining the correct value of the at least one parameter, the at least one processor is configured to:
  identify a phase component in the frequency-domain representation of the at least one captured image; and
  determine a correct value of the phase based on the identified phase component.

6. The system of claim 1, wherein the at least one parameter comprises a pitch, an orientation, a thickness and a phase of the multiscopic optical element, and wherein when determining the correct value of the at least one parameter, the at least one processor is configured to:
  select an estimated value of the phase of the multiscopic optical element;
  calculate at least one expected image of the display area that is expected to be captured by the at least one camera during display of the image, based on the displayed image, a correct value of the pitch, a correct value of the orientation, a correct value of the thickness, the estimated value of the phase, and an optical location of the at least one camera relative to the display area;
  determine whether the at least one expected image matches the at least one captured image of the display area; and
  when it is determined that the at least one expected image matches the at least one captured image, consider the estimated value of the phase as a correct value of the phase.

7. The system of claim 6, wherein when determining the correct value of the at least one parameter, the at least one processor is configured to:
  when it is determined that the at least one expected image does not match the at least one captured image, iteratively perform:
    selecting another estimated value of the phase; and
    calculating at least one another expected image of the display area, based on the another estimated value of the phase,
    until the at least one another expected image matches the at least one captured image or a maximum number of iterations has reached.

8. The system of claim 1, further comprising a tracker, wherein the at least one processor is configured to:
  determine an optical location of each eye of at least one user relative to the display area, using the tracker;
  select an estimated value of the at least one parameter of the multiscopic optical element; and
  generate the image to be displayed via the multiscopic display, based on the estimated value of the at least one parameter and the optical location of each eye of the at least one user relative to the display area.

9. The system of claim 8, wherein the at least one processor is configured to:
  for a plurality of images that present virtual content across different regions of the display area, perform:
    determining the optical location of each eye of the at least one user;
    generating the plurality of images;
    displaying the plurality of images via the multiscopic display, whilst capturing corresponding images of the display area using the at least one camera;

rectifying the corresponding captured images of the display area; and
    generating respective frequency-domain representations of the plurality of displayed images and respective frequency-domain representations of the corresponding captured images,
  wherein the correct value of the at least one parameter of the multiscopic optical element is determined based further on the respective frequency-domain representations of the plurality of displayed images and the respective frequency-domain representations of the corresponding captured images.

10. The system of claim 8, wherein the at least one processor is configured to:
  determine a subspace of an image space of the image that is not directed toward any eye of the at least one user, based on the estimated value of the at least one parameter and the optical location of each eye of the at least one user relative to the display area; and
  when generating the image, modify the determined subspace of the image space to direct light toward the at least one camera, wherein the determined subspace of the image space is modified based on at least one of: a predefined pattern, a spatio-temporal noise pattern.

11. The system of claim 1, wherein the image includes a spatio-temporal noise pattern.

12. The system of claim 1, further comprising an optical combiner arranged on an optical path of the multiscopic display, wherein the at least one camera is positioned such that a region of the display area lies within the field of view of the at least one camera both directly and via reflection from the optical combiner, and wherein the at least one processor is configured to:
  extract a first image segment from the at least one captured image of the display area corresponding to a direct view of the region of the display area;
  extract a second image segment from the at least one captured image corresponding to a reflected view of the region of the display area; and
  when rectifying, crop the first image segment and the second image segment; and
  when generating frequency-domain representations, generate a first frequency-domain representation corresponding to the first image segment and a second frequency-domain representation corresponding to the second image segment;
  wherein the correct value of the at least one parameter of the multiscopic optical element is determined based further on the first frequency-domain representation and the second frequency-domain representation.

13. A method comprising:
  displaying an image via a multiscopic display, whilst capturing at least one image of a display area of the multiscopic display using at least one camera, wherein the at least one camera is positioned such that the display area lies at least partially within a field of view of the at least one camera;
  rectifying the at least one captured image of the display area, to represent the display area only;
  generating a frequency-domain representation of the displayed image and a frequency-domain representation of the at least one captured image of the display area after rectifying; and
  determining a correct value of at least one parameter of a multiscopic optical element of the multiscopic display, based on the frequency-domain representation of the displayed image and the frequency-domain representation of the at least one captured image of the display area.

14. The method of claim 13, wherein the at least one parameter comprises a pitch of the multiscopic optical element, and wherein the step of determining the correct value of the at least one parameter comprises:

identifying a frequency component or repeating structure in the frequency-domain representation of the displayed image;

identifying periodic copies of the frequency component or repeating structure in the frequency-domain representation of the at least one captured image; and determining a correct value of the pitch based on a distance between adjacent ones of the periodic copies and a grid size of the frequency-domain representation of the at least one captured image.

15. The method of claim 13, wherein the at least one parameter comprises an orientation of the multiscopic optical element, and wherein the step of determining the correct value of the at least one parameter comprises:

identifying a frequency component or repeating structure in the frequency-domain representation of the displayed image;

identifying periodic copies of the frequency component or repeating structure in the frequency-domain representation of the at least one captured image;

determining a direction in which the periodic copies lie in the frequency-domain representation of the at least one captured image; and determining a correct value of the orientation based on the direction in which the periodic copies lie.

16. The method of claim 13, wherein the at least one parameter comprises a pitch and a thickness of the multiscopic optical element, wherein the at least one camera comprises a plurality of cameras that are arranged at different distances from the display area, the at least one captured image comprising a plurality of captured images of the display area, wherein the determining the correct value of the at least one parameter comprises:

identifying a frequency component or repeating structure in the frequency-domain representation of the displayed image;

identifying periodic copies of the frequency component or repeating structure in each of respective frequency-domain representations of the plurality of captured images;

determining respective observed values of the pitch corresponding to the plurality of captured images, based on respective distances between adjacent ones of the periodic copies in the respective frequency-domain representations and a grid size of the respective frequency-domain representations; and determining a correct value of thickness based on the different distances at which the plurality of cameras are arranged from the display area and the respective observed values of the pitch corresponding to the plurality of captured images.

17. The method of claim 13, wherein the at least one parameter comprises a phase of the multiscopic optical element, and wherein the step of determining the correct value of the at least one parameter comprises:

identifying a phase component in the frequency-domain representation of the at least one captured image; and determining a correct value of the phase based on the identified phase component.

18. The method of claim 13, wherein the at least one parameter comprises a pitch, an orientation, a thickness and a phase of the multiscopic optical element, and wherein the step of determining the correct value of the at least one parameter comprises:

selecting an estimated value of the phase of the multiscopic optical element;

calculating at least one expected image of the display area that is expected to be captured by the at least one camera during display of the image, based on the displayed image, a correct value of the pitch, a correct value of the orientation, a correct value of the thickness, the estimated value of the phase, and an optical location of the at least one camera relative to the display area;

determining whether the at least one expected image matches the at least one captured image of the display area; and when it is determined that the at least one expected image matches the at least one captured image, considering the estimated value of the phase as a correct value of the phase.

19. The method of claim 18, wherein when determining the correct value of the at least one parameter, the method further comprises:

when it is determined that the at least one expected image does not match the at least one captured image, iteratively performing:

selecting another estimated value of the phase; and calculating at least one another expected image of the display area, based on the another estimated value of the phase, until the at least one another expected image matches the at least one captured image or a maximum number of iterations has reached.

20. The method of claim 13, wherein the at least one camera is positioned such that a region of the display area lies within the field of view of the at least one camera both directly and via reflection from an optical combiner that is arranged on an optical path of the multiscopic display, and wherein the method further comprises:

extracting a first image segment from the at least one captured image of the display area corresponding to a direct view of the region of the display area;

extracting a second image segment from the at least one captured image corresponding to a reflected view of the region of the display area; and when rectifying, cropping the first image segment and the second image segment; and when generating frequency-domain representations, generating a first frequency-domain representation corresponding to the first image segment and a second frequency-domain representation corresponding to the second image segment;

wherein the correct value of the at least one parameter of the multiscopic optical element is determined based further on the first frequency-domain representation and the second frequency-domain representation.

* * * * *